United States Patent [19]

Furusawa et al.

[11] Patent Number: 5,202,064
[45] Date of Patent: Apr. 13, 1993

[54] METHOD OF EXTRUSION MOLDING AND APPARATUS THEREFOR

[75] Inventors: Toshihiro Furusawa; Atsushi Satoh, both of Chiba; Takashi Nakajima; Noriaki Matsugishi, both of Tokyo, all of Japan

[73] Assignees: Idemitsu Kosan Co., Ltd.; Seidensha Electronics Co., Ltd., both of Tokyo, Japan

[21] Appl. No.: 762,027

[22] PCT Filed: Jan. 21, 1991

[86] PCT No.: PCT/JP91/00062
§ 371 Date: Sep. 16, 1991
§ 102(e) Date: Sep. 16, 1991

[87] PCT Pub. No.: WO91/10552
PCT Pub. Date: Jul. 25, 1991

[30] Foreign Application Priority Data

Jan. 20, 1990 [JP] Japan .................. 2-10930

[51] Int. Cl.5 .................. B06B 3/00; B29C 47/12
[52] U.S. Cl. .................. 264/23; 264/108; 264/176.1; 425/141; 425/174.2
[58] Field of Search .................. 264/23, 24, 108, 176.1; 425/174.2, 174, 141

[56] References Cited

U.S. PATENT DOCUMENTS

| | | | |
|---|---|---|---|
| 3,285,442 | 11/1966 | Tigner | 264/23 |
| 3,456,295 | 7/1969 | Torigai et al. | 425/174.2 |
| 3,663,668 | 5/1972 | Fairbanks | 264/23 |
| 4,793,954 | 12/1988 | Lee et al. | 264/23 |
| 5,017,311 | 5/1991 | Furusawa et al. | 264/23 |
| 5,068,068 | 11/1991 | Furusawa et al. | 264/23 |

FOREIGN PATENT DOCUMENTS

| | | |
|---|---|---|
| 84475 | 9/1971 | Fed. Rep. of Germany ... 425/174.2 |
| 134052 | 2/1979 | Fed. Rep. of Germany ........ 264/23 |
| 52-4558 | 1/1977 | Japan . |
| 57-51441 | 3/1982 | Japan . |
| 1105566 | 3/1968 | United Kingdom ............. 425/174.2 |

*Primary Examiner*—Jeffery Thurlow
*Attorney, Agent, or Firm*—Kanesaka and Takeuchi

[57] ABSTRACT

An extrusion molding method for improving the fluidity of a molding material in the die and significantly improving the productivity of the molded article of uniform thickness, and an extrusion molding apparatus adapted for smoothly carrying out the method and having an unsophisticated constructional arrangement, are disclosed.

Molding is carried out while the die to which an extrusion orifice gap adjustment device is annexed is kept in resonant vibrations. The extrusion orifice gap adjustment device is annexed to a portion of the die constituting an extrusion orifice section, and molding is carried out while only the portion of the die is kept in resonant vibrations. The extrusion orifice gap adjustment device is annexed at a node of the resonant vibrations. The extrusion orifice of the die is provided at a position in register with a loop of the resonant vibrations, that is, at a position of the maximum effect of the vibrations, so that the frictional resistance between the molding material and the die surface in the vicinity of the extrusion orifice is reduced.

10 Claims, 7 Drawing Sheets

METHOD OF EXTRUSION MOLDING AND APPARATUS THEREFOR

TECHNICAL FIELD

This invention relates to extrusion molding of a molding material. More particularly, it relates to an extrusion molding method whereby the fluidity of the material within the die and at an extrusion orifice may be improved for improving the productivity of molded articles, and an apparatus for carrying out the extrusion molding method.

BACKGROUND ART

Recently, in connection with the molding materials, such as plastics, attempts have been made towards using the materials having a higher molecular weight or containing an increased quantity of a filler, such as an inorganic substance, with a view to improving their physical properties, such as strength, toughness or sliding properties.

However, these improved plastics exhibit only poor fluidity when residing in the die during the extrusion molding, thus leading occasionally to surface roughnesses of molded articles known as melt fracture. On the other hand, in order to prevent the die from being deformed owing to an excess pressure prevailing within the die, the molded article being then irregular in shape, one is obliged to lower the rate of extrusion, that is, to lower the yield.

For overcoming the above problem, there have been previously proposed various methods for improving the fluidity of the molding material residing within the die at the time of extrusion molding.

For example, JP Patent Laid-Open Patent Publication No. 57-51441 (1982) discloses a method wherein the molding material is fluidized while mechanical vibrations are applied to a die of an extrusion molding machine for improving the fluidity of the molding material so as to increase the rate of extrusion.

However, this known extrusion molding method suffers from the following disadvantages.

That is, since vibrations are forcedly applied to a die simply secured to the extrusion molding machine, vibrations may not be transmitted in effect, and hence no satisfactory results have been obtained.

In view of such inconvenience of the prior art method, the present inventors have previously proposed an extrusion molding method and an extrusion molding apparatus in which molding is carried out while the die is set into resonant vibrations with the aid of ultrasonic waves (JP Patent Application No. 63-294624). However, this known method has a drawback that, when a hitherto known method of adjusting the gap of the extrusion orifice necessary for producing a molded article of a uniform thickness is simply applied, the state of resonant vibrations of the die is disturbed and hence a sufficient effect proper to the resonant vibrations cannot be obtained.

The present invention provides a solution to this problem. It is an object of the present invention to provide a method for extrusion molding according to which a die having extrusion orifice gap adjustment means annexed thereto is set into resonant vibrations for improving the fluidity of the molding material in a die as well as productivity of the molded article of a uniform thickness, and an apparatus capable of carrying out the method smoothly and having an unforced constructional disposition.

DISCLOSURE OF THE INVENTION

For accomplishing the above object, the extrusion molding method according to first aspect resides in a molding method wherein molding is carried out while a die having extrusion orifice gap adjustment means annexed thereto is driven into resonant vibrations.

The extrusion molding method according to a second aspect resides in a method in which, for improving the state of flowing of the molding material in the vicinity of the extrusion orifice of the die where in general the molding material can flow most difficultly, molding is carried out while a part of the die constituting the extrusion orifice and having the extrusion orifice gap adjustment means annexed thereto is set into resonant vibrations.

In a preferred embodiment, the extrusion orifice of the die is provided at a position in register with the loop of the resonant vibrations, that is at a position of the maximum effect of the vibrations, and the frictional resistance between the molding material and the die surface in the vicinity of the extrusion orifice is reduced when carrying out molding.

In another preferred embodiment, the die holder and the inlet of the molding material into the die are set so as to be in register with the nodes of the resonant vibrations when carrying out molding.

In an extrusion molding apparatus in which the molding material is supplied from an extruder to a die and extruded at an extrusion orifice of the die, extrusion orifice gap adjustment means is annexed to the die and at least one vibration generator is provided for setting the die into resonant vibrations.

In a preferred embodiment of the extrusion molding apparatus, for producing effective resonant vibrations, the resonant frequency of the extrusion orifice gap adjustment means is selected to be equal to that of the die.

In another preferred embodiment, for producing effective resonant vibrations, extrusion orifice gap adjustment means is annexed at a node of the resonant vibrations.

In still another preferred embodiment, only a part of the die in which the extrusion orifice gap adjustment means is annexed and which constitutes the extrusion orifice is set into resonant vibrations by at least one vibration generator.

Meanwhile, in the context of the present specification, the extrusion orifice gap adjustment means represents means for performing fine adjustment of the extrusion orifice to a desired gap value.

BEST EMBODIMENT FOR PRACTICING THE INVENTION

Preferred embodiments of the above mentioned means for solution will be hereinafter explained.

A first embodiment of the extrusion apparatus will be first explained by referring to the drawings.

Figure 1:
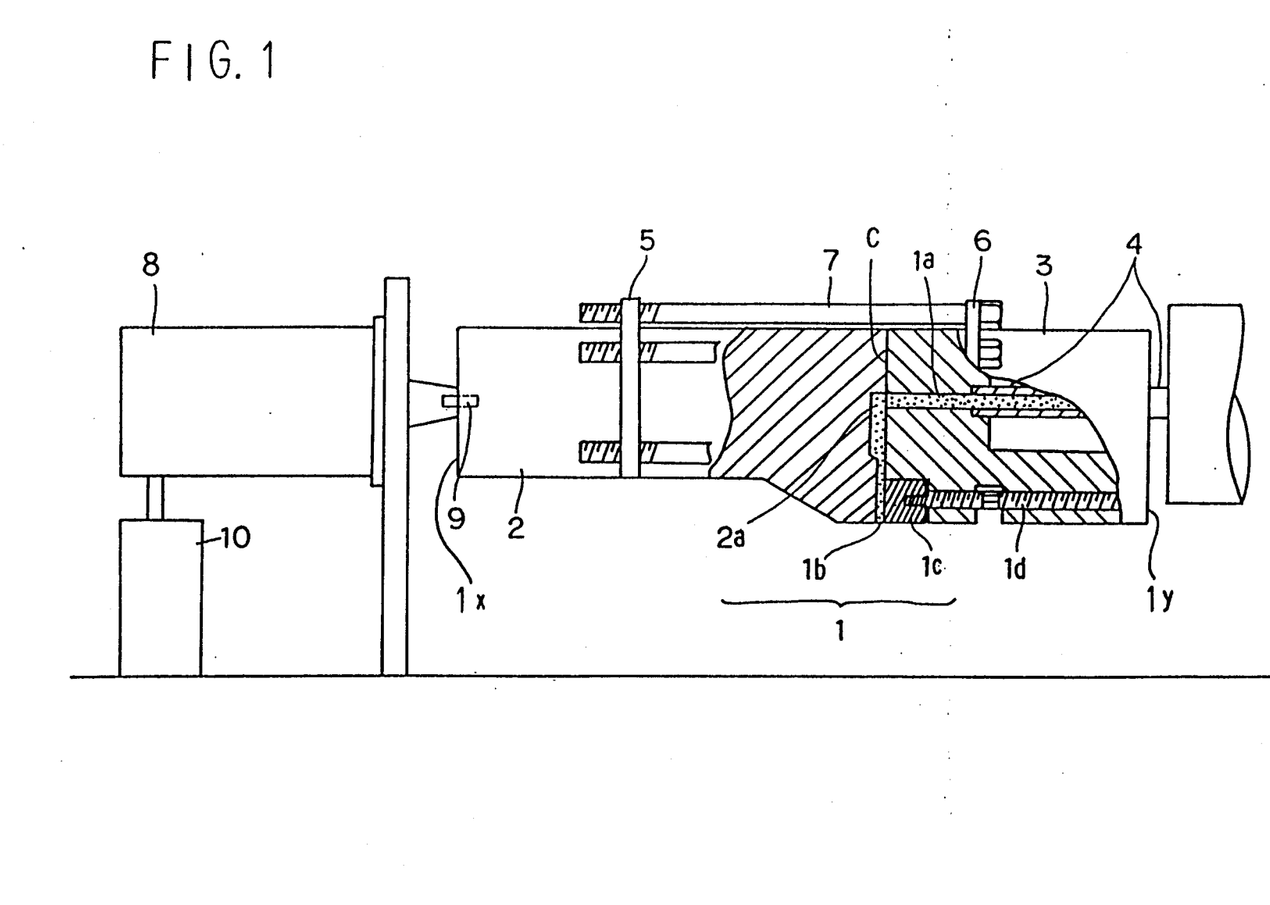
FIG. 1 is a side elevation, shown partly in section, showing a first embodiment of an extrusion molding apparatus according to the present invention.
Figure 2:
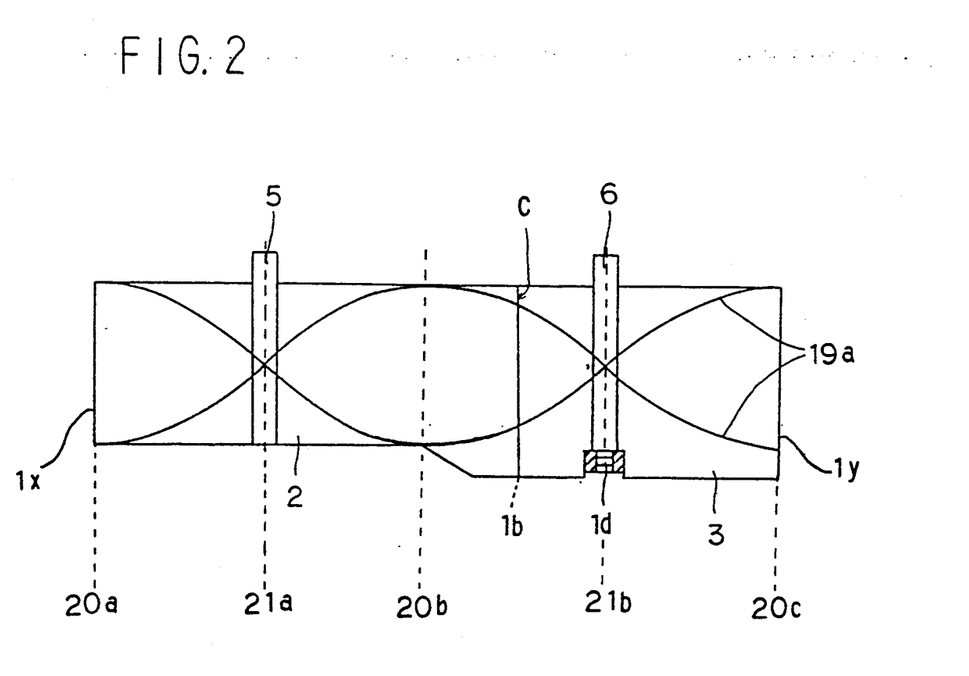
FIG. 2 is an illustrative view showing the wavelength and the displacement waveform when a die of the extrusion molding apparatus shown in FIG. 1 is excited into 1 wavelength resonant vibrations.

FIG. 1 is a side elevation, shown partly in section, showing a first embodiment of an extrusion molding apparatus according to the present invention, and FIG. 2 is a diagram showing a displacement waveform 19a during resonant vibrations of the apparatus. The displacement waveform 19a of FIG. 2 is not indicative of the actual amplitude of vibrations.

Referring to FIG. 1, 1 is a die partitioned into a first die member 2 and a second die member 3. The die 1 has two opposite sides 1x and 1y which are disposed on the left side of the first die member 2 and on the right side of the second die member 3. An extrusion orifice 1b is formed on a contact surface of the first die member 2 contacting with the second die member 3. In the extrusion orifice 1b, there are provided a movable member 1c as extrusion orifice gap adjustment means and a gap adjustment bolt 1d for interconnecting the movable member 1c and the second die member 3 and for moving the movable member 1c. For affording efficient vibrations to the movable member 1c, the movable member 1c and the gap adjustment bolt 1d are preferably so mounted as to contact with the second die member 3 to have resonant vibrations therewith with a large contact area. In addition, the movable member 1c and the gap adjustment bolt 1d are adapted for being oscillated in resonance at the same resonance frequency as that of the die 1. In this manner, the die may be oscillated in resonance without disturbances of resonance even though the extrusion orifice adjustment means is annexed to the die. In order that the movable member 1c may be rendered movable by the gap adjustment bolt 1d, it suffices if the bolt 1d is threaded in its entirety so that the pitch of threads cut in a first bolt part screwed into the movable member 1c is slightly different from that of threads cut in a second bolt part screwed into the second die member 3. For example, the bolt 1d is machined to a hexagonal outer contour at a position corresponding to a node of the resonant vibrations, and the corresponding portion of the second die member 3 is cut off to form a notch so that the gap adjustment bolt 1d may be rotated thereat during molding.

The die 1 may be formed of metallic materials customarily employed for extrusion, or of various other materials, such as ceramics or graphite. Of these, the materials which will undergo only limited losses in the transmission of vibrations at the molding temperature, above all, duralmin, titanium alloys, K-monel, phosphor bronze or graphite, are most preferred.

Preferably, the first die member 2 and the second die member 3, partitioned as described above, are contacted with each other on a contact surface C with a surface contact to the maximum extent possible so that the vibrations may be transmitted most efficiently. The die 1 may also not be partitioned, that is, remain unitary, or be partitioned into three or more members. When the die is constituted by plural members, these members may be formed of homogeneous materials or heterogeneous materials. The die 1 may also be plated or coated with Teflon or titanium nitride to improve its abrasion or corrosion resistance or to lower its friction coefficient with respect to the molding material.

When the die 1 is oscillated in resonance, almost all portions of the die 1 are set into oscillations, so that, if a conventional plate-shaped heater is mounted on the die, the electrical heating element in the heater may be destroyed as a result of the vibrations. Therefore, a far infrared type heater, capable of heating the die 1 even without contact with the die, is preferably employed. In such case, the heater is contacted only with a non-oscillating portion of the die 1 to have resonant vibrations, that is at a node of resonance where the displacement waveforms intersect each other (for example, at 21a or 21b). Thus it suffices if the die 1 and the far infrared heater are secured to each other at the node with the aid of, for example, a set screw. An air inlet attached to a die for inflation molding or an inert gas inlet attached to a variety of dies for expansion extrusion molding may also be provided at the node of resonance, as in the method of securing the heater as mentioned above. The inlet components are preferably formed of a material which may be subjected to fatigue due to vibrations to a lesser extent, such as titanium alloy.

4 is a nozzle of an extruder, such as a single-screw or a multi-screw extruder, not shown. The molding material is supplied from the nozzle 4 to the die 1 by way of an entrance 1a so as to be ultimately extruded at an extrusion orifice 1b by way an entrance 2a. The nozzle 4 is secured to the second die member 3 by securing means, such as screw, at a position substantially corresponding to the node of resonance of the second die member 3. In this manner, the vibrations imparted to the die 1 may hardly be transmitted to the nozzle 4. In addition, a cushioning member formed by, for example, fibers of titanium alloys, may be provided at a point of contact between the nozzle 4 and the second die member 3 for preventing the vibrations from being transmitted to the nozzle 4.

Although the direction of extrusion of the molding material by means of the extrusion orifice 1b of the die 1 and the direction of vibrations transmitted to the extrusion orifice may be selected arbitrarily, it is preferred that the extruding direction be orthogonal to the vibrating direction, in order to prevent the surface temperature of the extruded material from increasing owing to the ultrasonic waves and to raise the critical extrusion speed corresponding to the initiation of melt fracture. The effect of the vibrations at the extrusion orifice 1b may be augmented or diminished by changing the shape of the extrusion orifice 1b.

5 and 6 are flanges provided on the first die member 2 and the second die member 3, respectively, as die holding members. These flanges are provided at points of nodes of resonance of the first die member 2 and the second die member 3 (points 21a and 21b). It is preferred that the flanges 5 and 6 be as thin in thickness as possible to prevent the vibrations of the die 1 from being transmitted to outside and to reduce the losses of vibrations which might otherwise be caused at the flanges.

7 is a bolt uniformly tightening the first die member 2 and the second die member 3 by the intermediary of the flanges 5 and 6. It is preferred that the bolt 7 be not in contact with the die 1 in order to prevent the vibrations from being transmitted from the die 1 to outside.

As tightening means for the die members, a tapped hole may be provided in the die 1 and a bolt introduced into the tapped hole for tightening in a known manner. In this case, it is preferred that the contact point between the bolt and the die sections be in the vicinity of the node of resonance, and that the die and the bolt be contacted with as small a contact area as possible.

8 is an ultrasonic vibrator connected to the die at such a position as to cause resonant vibrations of the die 1. For transmitting the vibrations produced at the ultrasonic vibrator 8 to the die with ease and at a higher efficiency, it is preferred that the contact point between the ultrasonic vibrator 8 and the die 1 be in register with a portion of the die 1 oscillating with the maximum amplitude, that is, a loop of resonance (such as a point 20a) at which that displacement waveforms are removed from each other to the maximum extent. Other loops of resonance are shown for example at points 20b and 20c.

It is noted that any of the vibration apparatus such as electric type, hydraulic type or ultrasonic type, having the frequency of vibrations in the range of 10 Hz to 10 MHz, may be used as the vibration apparatus for producing the resonant vibrations of the die 1. Above all, the ultrasonic wave vibration apparatus is most preferred because a higher energy efficiency may thereby be achieved.

A vibration transmitter, not shown, may be incorporated between the die 1 and the ultrasonic vibrator 8 as an aid or means for transmitting the vibrations. By suitably selecting the shape of the vibration transmitter, the amplitude of the vibrations generated by the ultrasonic vibrator 8 may be easily increased or decreased in desired manner.

There is no specific limitation to the number of the vibration generator or transmitter connected to the die 1. However, when a plurality of the vibration generators or transmitters are connected to the die 1, it is necessary to adjust the time of vibrations to prevent the state of resonance of the die 1 from being disturbed. The larger the number of the vibration generators connected to the die 1, the more extensive is the vibration afforded to the die.

10 is an ultrasonic oscillator for producing ultrasonic vibrations in the ultrasonic vibrator 8. It is excited into vibrations at the resonant frequency of the die 1 to produce the resonant vibrations of the die 1. The resonant frequency of the die 1 is set at the time of design and is manufactured to a frequency that may be followed the ultrasonic oscillator 10, so that slight changes in the resonant frequency caused by temporal changes in the load or temperature since the time of delivery of the molding material from the nozzle 4 of the extruder to the die 1 until the time of exiting of the molding material at the extrusion orifice 1b may perpetually be coped with, while the electric power may be supplied in a required amount (less than the maximum output) to meet instantaneous changes in power demand. In other words, an automatic frequency follow-up system and an automatic power control system have been adopted to allow to maintain the state of resonant vibrations. Such system is disclosed in, for example, JP Patent Laid-Open Publication 49-59627 (1974).

In the die shown in FIG. 1, the direction of transmission of the vibrations in the vicinity of the extrusion orifice is orthogonal to the extruding direction of the molding material. However, the die 1 may be provided with a mechanism for modifying the direction of vibrations of the die 1. For example, converters such as L-L, L-R or L-L-R converters, customarily employed for ultrasonic vibrations, may be provided in the die.

Figure 4:
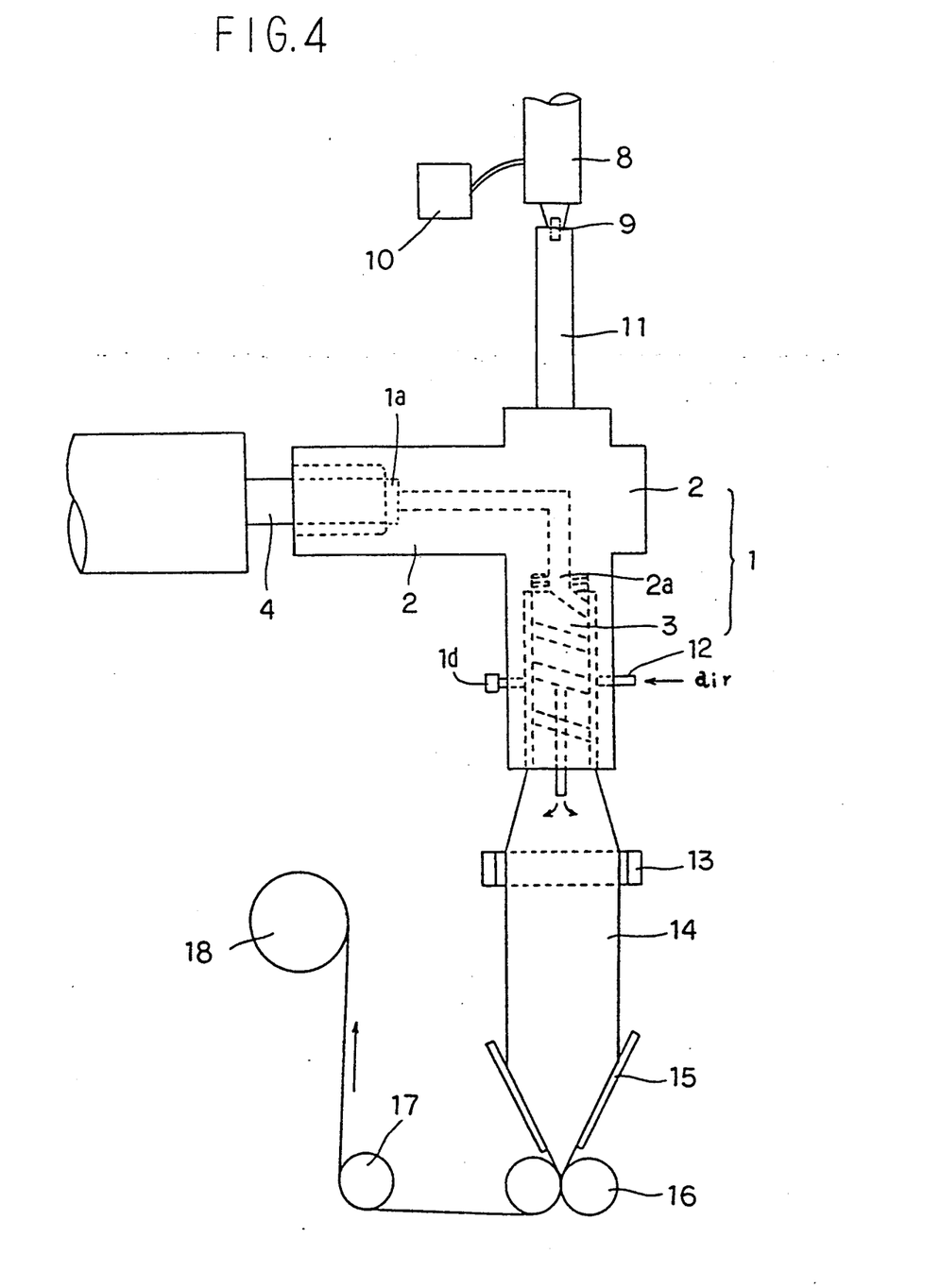
FIG. 4 is a side elevation, shown partly in section, showing a second embodiment of the extrusion molding apparatus according to the present invention.

FIG. 4 shows an extrusion molding apparatus according to a second embodiment of the present invention wherein the direction of transmission of the vibrations in the vicinity of the extrusion orifice is selected to be the same as the extruding direction of the molding material. With the present apparatus, resonant vibrations may be performed with displacement waveforms shown in FIG. 5.

Figure 5:
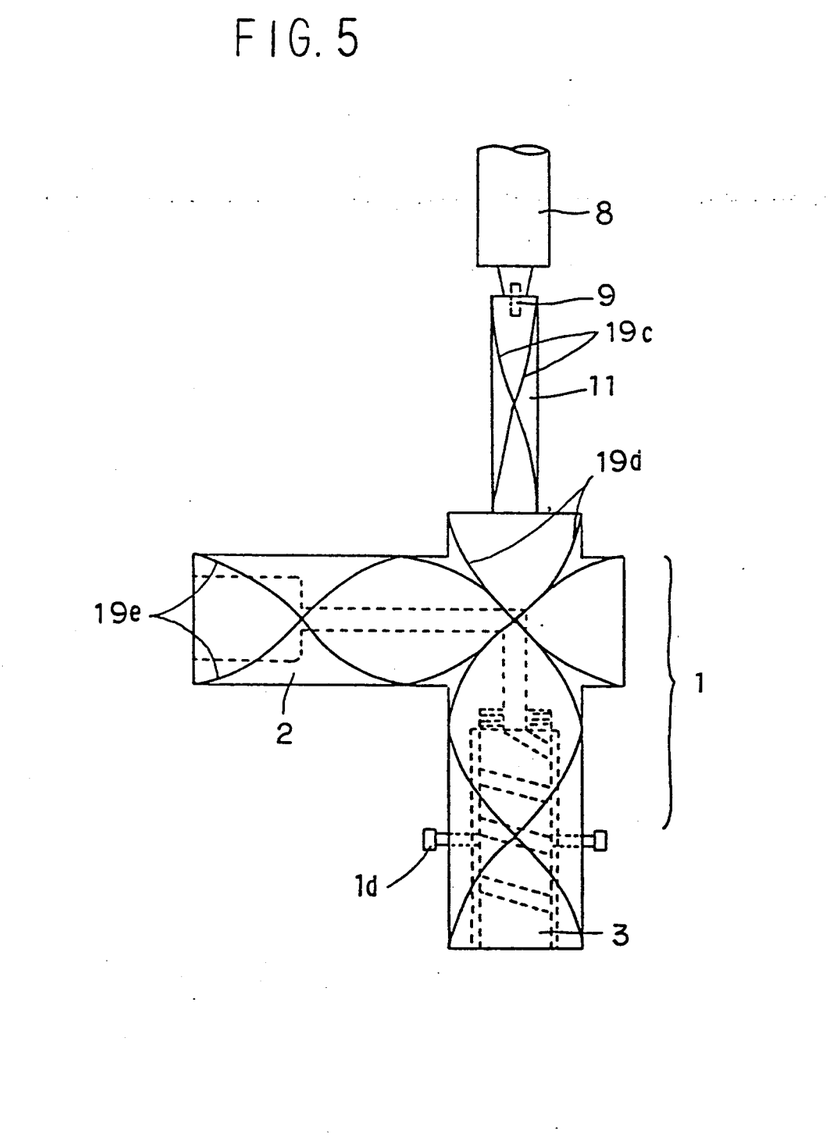
FIG. 5 is an illustrative view showing the wavelength and the displacement waveform when a die in the extrusion molding apparatus shown in FIG. 4 is excited into resonant vibrations.

More specifically, the die 1 shown in FIG. 4 is provided with a mechanism for converting the direction of the vibrations known as the L-L converter. In this case, vibrations may also be transmitted at the converter in a direction deviated 90° with respect to the direction of transmission of the vibrations (FIG. 5). The ultrasonic vibrator 8 is coupled to the die 1 by means of a vibration transmitter 11.

The displacement waveform is shown at 19c, when the vibration transmitter 11 is in resonant vibrations by the vibrations generated by the ultrasonic vibrator 8. The displacement waveform is shown at 19d and 19e, when the die 1 is in resonant vibrations.

A mandrel (die member) 3 is designed in advance so as to have the same resonant frequency as that of the die member 2, and is coupled to the die member 2 by a set screw. Although there is no specific limitation to the coupling position between the die member 2 and the mandrel 3, it is preferred that, for efficiently transmitting the vibrations of the die member 2 to the mandrel 3, the connecting surfaces therebetween be at the loop of the resonance of the die member 2.

If the slackening of the set screw of the mandrel 3 occurs to a larger extent, the coupling surface between the mandrel 3 and the die member 2 may be disposed in the vicinity of the node of resonance of the die member 2, while the mandrel 3 may be contacted with the die member at a position other than the screw portion to be located as close as possible to the loop of resonance of the die member 2.

The gap adjustment bolt 1d for the extrusion orifice as the extrusion orifice gap adjustment means is preferably mounted at a point of a node of resonance of the die member 2 and the mandrel 3 for preventing vibrations from being transmitted to the gap adjustment bolt 1d. In this manner, the die may be set into resonant oscillations, because the state of resonance is not disturbed even when the gap adjustment bolt 1d is mounted on the die. Fine adjustment of the gap of the extrusion orifice may be achieved by adjusting the gap between the die 1 and the mandrel 3 by tightening plural gap adjustment bolts 1d provided in the die 1. Meanwhile, in FIG. 4, 12 is an air supply duct, 13 an air cooling ring, 14 a cylindrical tube, 15 a stabilization plate, 16 a pair of pinch rolls, 17 a guide roll and 18 a take-up device for a molded product.

Figure 6:
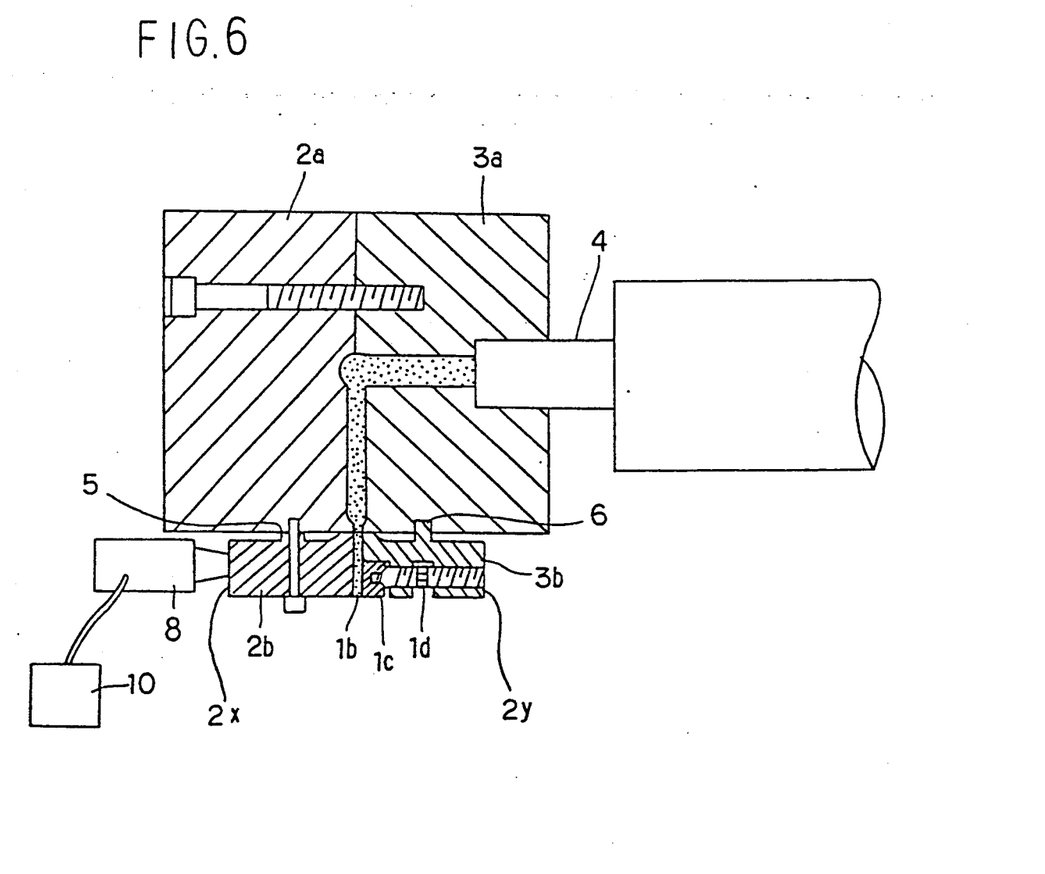
FIG. 6 is a side elevation, shown partially in section, showing a third embodiment of the extrusion molding apparatus according to the present invention.
Figure 7:
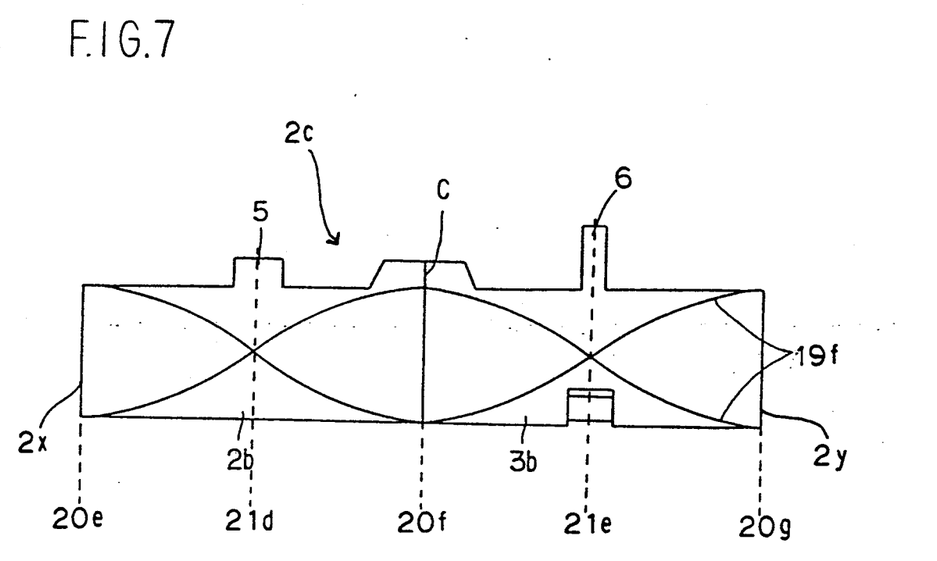
FIG. 7 is an illustrative view showing the wavelength and the displacement waveform when a die of the extrusion molding apparatus shown in FIG. 6 is excited into resonant vibrations.

FIG. 6 shows an extrusion apparatus according to a third embodiment, wherein a die 1 is partitioned into die members 2a, 3a and die members 2b, 3b. Ultrasonic vibrations are imparted to the die members 2b, 3b constituting the vicinity of the extrusion orifice for setting these die sections into resonant vibrations. Die holders 5, 6 are provided at node of resonance of the die members 2b, 3b to prevent the vibrations from being transmitted to the die members 2a, 3a constituting the main body of the die. An extrusion orifice 1b is provided at a contact surface of the die member 2b with the die member 3b and the die member 2a, 3a are contacted with the die members 2b, 3b in the vicinity thereof to prevent the molding material from being leaked at a gap otherwise formed thereat. The ultrasonic vibrator 8 produces longitudinal vibrations. The extrusion orifice 1b is positioned at an loop of resonance so that the vibrations of the die members 2b, 3b are not transmitted to the die members 2a, 3a in the vicinity of the extrusion orifice. The die members 2b, 3b constitute a part 2c of the die. The die part 2c has opposite sides 2x and 2y which are the left side of the die member 2b and the right side of the die member 3b, respectively. A movable member 1c and a gap adjustment bolt 1d functioning as extrusion orifice gap adjustment means, are provided in the extrusion orifice 1b, as in the embodiment shown in FIG. 1. The movable member 1c and the gap adjustment bolt 1d are contoured and sized so as to be vibrated in resonance at the same resonant frequency as that of the die members 2b and 3b (FIG. 7). 19f is a displacement waveform when the die members 2b, 3b and 1c, 1d are vibrated in resonance at the same resonant frequency. 20e, 20f and 20g are the loops of resonance, while 21d and 21e are the nodes of resonance.

With the above described extrusion apparatus, conventional dies may be used as die members 2a and 3a, so that die designing and production may be advantageously simplified to a larger extent. Since it is a portion of the die that is vibrated in resonance, the energy necessary for resonant vibrations may advantageously be reduced.

The method for extrusion molding with the aid of the above described extrusion molding apparatus, in accordance with the present invention, be hereinafter explained by referring to FIG. 1.

The gap adjustment bolt 1d and the movable member 1c are first operated for performing fine adjustment of the gap of the extrusion orifice 1b of the die 1. By this fine adjustment, the thickness of the extruded material, such as the film or sheet, may be improved in accuracy to enable the film or sheet to be produced with a uniform thickness.

Meanwhile, gap adjustment of the extrusion orifice 1b may be made even during the extrusion molding operation.

Figure 3:
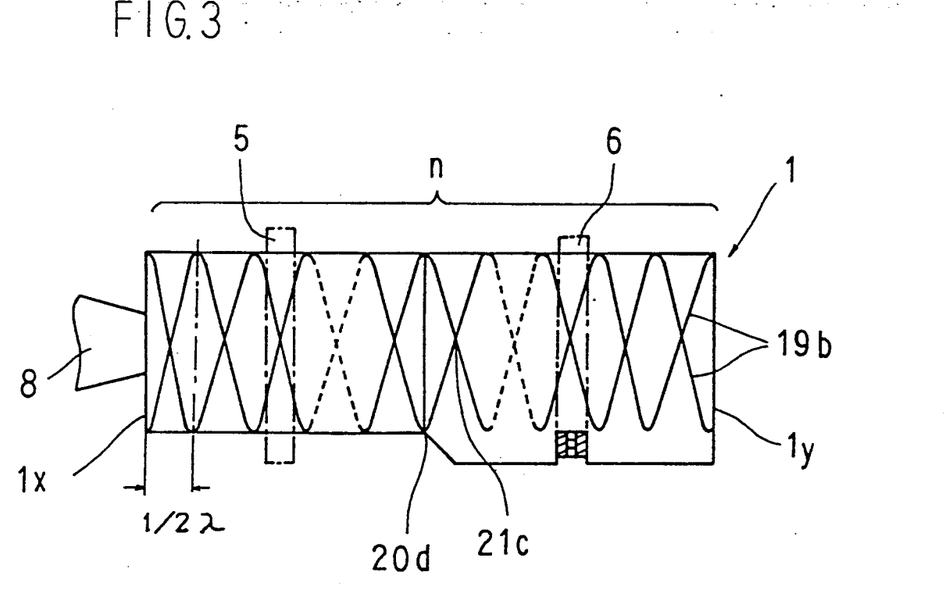
FIG. 3 is an illustrative view showing the wavelength and the displacement waveform when a die of the extrusion molding apparatus shown in FIG. 1 is excited into n-wavelength resonant vibrations.

The nozzle 4 of the molding machine, not shown, is then connected to the die member 3 and the molding material is supplied to the die 1 to perform extrusion molding. Simultaneously, the ultrasonic vibrator 8 is caused to produce ultrasonic vibrations by ultrasonic oscillator 10 for setting the die 1 into n-wavelength resonant oscillations (FIGS. 2 and 3). Referring to FIG. 3, vibrations are produced so that, between the surface 1x of the die 1 connected to the vibrator 8 and the opposite surface 1y, the number of loop and the number of nodes of the standing wave generated during resonant vibrations are equal to 2n+1 and 2n, respectively. 19b is a displacement waveform. One of the loops is 20d and one of the nodes is 21c.

The number n with the n-wavelength resonance is m/2, m being a positive integer, Usually, n is ½ to 10. For reducing the losses of the ultrasonic vibrations at the die 1, n is preferably less than 3.

Although the oscillation frequency may be selected arbitrarily, it is preferred that, in order for the vibrations to act most effectively on the fluidized material, the oscillation frequency be in the range from 10 to 100 kHz.

The mode of vibrations may be any of well-known modes, such as transverse, torsional, radial or bended vibrations, in addition to the longitudinal vibrations.

The amplitudes of the ultrasonic vibrations afforded to the die 1 may be 0.1 to 100 μm for effectively improving the fluidity of the molding material.

The molding material moldable in accordance with the above described extrusion molding method and apparatus may be such material as will exhibit at least certain fluidity during molding, such as, for example, organic materials such as thermoplastic resins, thermosetting resins, rubber or elastomer, inorganic materials such as inorganic polymer materials, ceramics, metal or glass, other foodstuff or mixtures thereof.

The following materials may be enumerated as the plastics: The thermoplastic resins include α-olefinic resins, such as polyethylene, polypropylene, polystyrene, syndiotactic polystyrene, vinyl chloride resin, polybutene, ultra high molecular weight polyethylene, polymethyl pentene, ionomer resin or polybutylene; polyester resins, such as polyethylene terephthalate, polybutylene terephthalate or polyallylate; polyether resins, such as polysulfone, polyether sulfone, polyether ketone, polyether ether ketone, polyallyl sulfone, polyoxybenzylene, polyphenylene oxide or polycyanoallyl ether (JP Patent Laid-Open Publication No. 223226/1987); polycarbonate resin; polyimide resin; polyamide resin; polyamide imide resin; methacrylic resin; fluorine resin; methacrylate-butadiene-styrene (MBS) resin; acrylate-acrylonitrile-styrene (AAS) resin; acrylonitrile-styrene (AS) resin; chlorinated acrylonitrile-polyethylene-styrene (ACS) resin; acrylonitrile-butadiene-styrene (ABS) resin; polyacetal resin; cellulose resin; polyvinylidene chloride; chlorinated polyethylene; ethylene-vinyl acetate (EVA) resin; polyurethane resin; silicone resin; allylic resin; furan resin; or liquid crystalline polymer. The thermosetting resins include epoxy resin, phenolic resin, polybutadiene resin, silicone resin, unsaturated polyester resin or amino resin. The thermoplastic elastomers include styrenebutadiene elastomer, polyester elastomer, polyethylene elastomer, urethane elastomer and vinyl chloride elastomer.

The extrusion molding method according to the present invention means any molding methods in which the molding material in the fluidized state travels through a die so as to be extruded into a predetermined shape, such as inflation molding, sheet molding, round-bar molding, pipe molding, profiled extrusion molding, multi-layer co-extrusion molding, filament molding, blow molding, wire coating or extrusion foam molding.

Above all, a film or a higher strength may be produced by inflation molding in accordance with the present invention. Although the die temperature, extrusion quantity and the blow-up ratio may be determined as a function of the feed material and the ultimate molded product, the die temperature of (Tm) +20° C. to (Tm) +130° C., above all, (Tm) +20° C. to (Tm) +35° C., Tm being the melting temperature of the feed material, and the blow-up ratio of 1 to 5, are preferred.

EXPERIMENTAL EXAMPLES

The results of experiments conducted by using the extrusion molding method and apparatus according to the present invention will be hereinafter explained in comparison with comparative examples.

EXPERIMENTAL EXAMPLE 1

Extrusion Molding Apparatus: Apparatus shown in FIG. 1
Molding Material: Polyethylene (manufactured by Idemitsu Petrochemical Co., Ltd., 640 UF, inflation grade)
Die: One-wavelength Resonator (FIG. 2)
  Location of the Extrusion Orifice 1b: Somewhere between the node and the loop of resonation of die 1 by ultrasonic waves
Straight Manifold type T-die
Extrusion Orifice Contour: gap; 0.5 mm, width; 240 mm
Ultrasonic oscillator: Fundamental Frequency; 19.15 kHz, Amplitude; 10 μm, Manufactured by Seidensha Electronics Co., Ltd., SONOPET 1200-B
Mode of Vibration: Longitudinal Vibration
Extrusion Conditions: Die Temperature; 190° C., Rate of Extrusion; 4–80 Kg/hr
Sheetz Cooling System: Touch-roll System
Sheet Thickness: about 200 μm Extrusion molding was carried out under the above conditions, while the die was kept in the state of resonant vibrations, and the state of occurrence of melt fracture at this time was checked. The pressure within the nozzle, which is a measure of the fluid flow resistance of the molding material occurring in the passage from the nozzle to the die exit orifice, was measured for the rate of extrusion of 4 Kg/hr. Further, when the rate of extrusion was set to 10, 40 and 80 Kg/hr, sheets adjusted for thickness by five gap adjustment bolts were taken up and samples each 100 mm in width from the sheet center towards both sides were cut to check for thickness fluctuation coefficients along the sheet width.

EXPERIMENTAL EXAMPLE 2

An experiment was conducted under the same conditions as in Experimental Example 1, except using a die 1 having an extrusion orifice 1b at the loop of resonation by ultrasonic waves.

The results of Experimental Examples 1 and 2 are shown in Table 1.

COMPARATIVE EXAMPLE 1

An experiment was conducted under the same conditions as in Experimental Example 1, except stopping the oscillation by ultrasonic waves.

COMPARATIVE EXAMPLE 2

Figure 8:
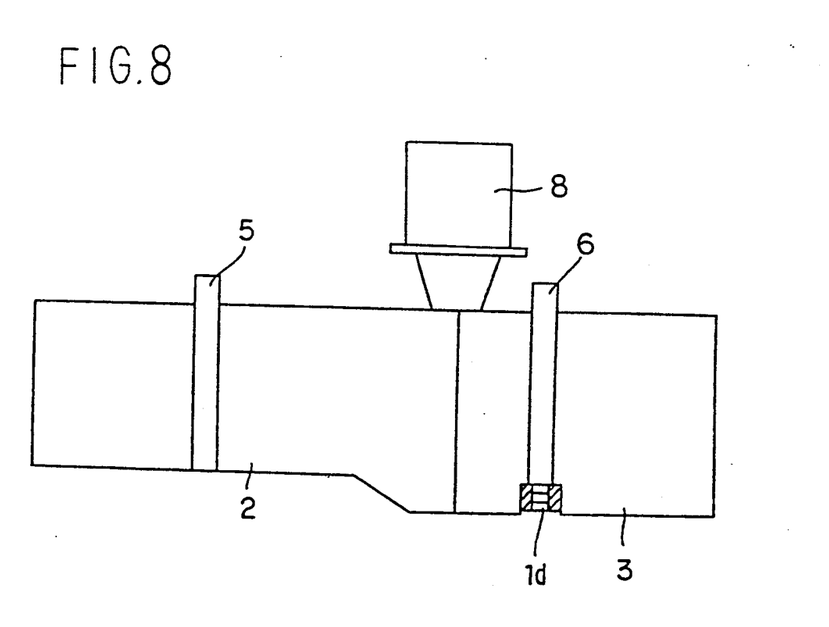
FIG. 8 is a diagrammatic view showing an apparatus employing an ultrasonic vibrator and not encompassed by the present invention.

An experiment was conducted under the same conditions as in Experimental Example 1, except abutting the ultrasonic vibrator 8 to a coupling portion between the die members 2 and 3, as shown in FIG. 8. The die was not in resonant vibrations at this time.

The results of Comparative Examples 1 and 2 are shown in Table 1.

TABLE 1

| | Rate of Extrusion (Kg/hr) | | | |
|---|---|---|---|---|
| | 4 | 10 | 40 | 80 |
| | (pressure at nozzle part Kg/cm$^2$) | (Sheet Thickness Fluctuation Coefficient Sheet Thickness %) | | |
| Exp. 1 | ○ (151) | ○ (2.8) | ○ (3.1) | Δ (3.5) |
| Exp. 2 | ○ (126) | ○ (3.0) | ○ (2.5) | ○ (2.8) |
| Comp. Ex. 1 | Δ (274) | x (−) | x (−) | x (−) |
| Comp. Ex. 2 | Δ (277) | x (−) | x (−) | x (−) |

○ : no melt fracture
Δ : onset melt fracture
x : severe melt fracture

Thus it has been found that, by impressing ultrasonic waves for setting the T-die into resonant vibrations, the fluid flow resistance of the molding material can be lowered and the melt fracture can be prevented from occurring up to an extremely high rate of extrusion, while the gap of the extrusion orifice may be adjusted easily and a sheet with reduced thickness fluctuations can be produced with improved profitability.

EXPERIMENTAL EXAMPLE 3

Extrusion Molding Apparatus: Apparatus shown in FIG. 4
Molding Material: Linear Low-Density Polyethylene (manufactured by Idemitsu Petrochemical Co., Ltd., 0134H, inflation grade)
Die: Formed of Titanium Alloy and equipped with L-L converter
  Position of Extrusion Orifice 1b: loop of Resonance
  Extrusion Orifice Inner Diameter, 30 mm;
  Extrusion Orifice Gap, 1.8 mm
Ultrasonic Oscillator: Same as in Experimental Example 1
Mode of Vibration: Longitudinal Vibration
Extrusion Conditions:
  Die Temperature, 160° C.
  Quantity of Extrusion, 40 Kg/hr
  Blow-up Ratio, 1.95
The height position of the cooling ring was set to a value at which the valve was stabilized.
Thickness of Molded Article: 30 μm An inflation film was prepared under the above conditions and the film impact strengths as well as degree of haze was measured.

COMPARATIVE EXAMPLE 3

Ultrasonic oscillations were stopped and an experiment was conducted under the same conditions, as in Experimental Example 3. However, since melt fracture occurred significantly the experimental was suspended.

COMPARATIVE EXAMPLE 4

The procedure of Comparative Example 3 was followed, except raising the die temperature gradually, in order to search for a temperature at which a satisfactory film can be produced by molding. It was found that a film having a satisfactory appearance can be obtained at 260° C.

The impact strength and the degree of haze were measured of the film.

The results of the Experimental Example 3 and the Comparative Example are shown in Table 2.

TABLE 2

| | film impact strength (Kg · cm/cm) | degree of haze (%) |
|---|---|---|
| Exp. Ex. 3 | 4,500 | 8.2 |
| Comp. Ex. 4 | 2,800 | 8.3 |

INDUSTRIAL UTILIZABILITY

In accordance with the above described extrusion molding method of the present invention, by vibrating the die with the extrusion orifice gap adjustment means annexed thereto in resonance, the fluidity of the molding material, especially the material with low fluidity, within the die, may be improved, as a result of which the occurrences of melt fracture and fluctuations in the film thickness may be reduced to improve the productivity of the extruded product of the uniform thickness significantly.

In this case, inflation molding in accordance with the present invention leads to production of the film of a higher film strength.

Likewise, with the extrusion molding apparatus of the present invention, the molding material residing in the die may be improved in fluidity, and the extruded product may be produced with the desired shape with higher productivity, while the molding method may be carried out smoothly.

We claim:

1. An extrusion molding method comprising,
preparing a molding apparatus including an extruder for supplying a molding material; a die formed separately from the extruder, said die having an entrance for receiving the molding material from the extruder and an extrusion orifice for extruding the molding material from the entrance; extrusion orifice gap adjustment means attached to the die, said adjustment means having a movable member to define a gap of the extrusion orifice and an adjusting device attached to the movable member for moving the movable member to adjust the gap; and a vibration producing device attached to the die for providing resonant vibration to the die, and
extruding the molding material through the die while vibrating the die without substantially transmitting vibration to the extruder by means of said vibration producing device so that the extrusion orifice is located to register with a loop of resonant vibration to reduce frictional resistance between the molding material and the extrusion orifice, and the adjusting device is located to register with a node of the resonant vibration to effectively vibrate the die.

2. An extrusion molding method according to claim 1, wherein said vibration producing device provides vibration to the die so that a distance between opposite surfaces of the die corresponds to n-wavelengths of the resonant vibration, n being equal to m/2 and m being an integer.

3. An extrusion molding method according to claim 2, wherein said molding material is extruded from the extrusion orifice of the die in a direction perpendicular to a direction of the vibration.

4. An extrusion molding method according to claim 3, wherein said die is formed of two parts having die holding members, said die holding members being located in nodes of the resonant vibration.

5. An extrusion molding method according to claim 1 wherein the resonant frequency of said extrusion orifice gap adjustment means is selected to be equal to the resonant frequency of said die.

6. An extrusion molding apparatus comprising,
an extruder for supplying a molding material,
a die formed separately from the extruder, said die having an entrance for receiving the molding material from the extruder and an extrusion orifice for extruding the molding material from the entrance,
extrusion orifice gap adjustment means attached to the die, said adjustment means having a movable member to define a gap of the extrusion orifice and an adjusting device attached to the movable member for moving the movable member to adjust the gap, and
a vibration producing device attached to the die for providing resonant vibration to the die, said vibration producing device providing vibration to the die without substantially transmitting vibration to the extruder so that the extrusion orifice is located to register with a loop of resonant vibration to reduce frictional resistance between the molding material and the extrusion orifice, and the adjusting device is located to register with a node of the resonant vibration to effectively vibrate the die.

7. An extrusion molding apparatus according to claim 6, wherein said extrusion orifice is arranged in the die so that the molding material is extruded from the orifice in a direction perpendicular to a direction of the vibration.

8. An extrusion molding apparatus according to claim 7, wherein said die is formed of two parts having die holding members, said die holding members being located in nodes of the resonant vibration and being connected together.

9. An extrusion molding apparatus according to claim 6, further comprising a cushioning member situated between the extruder and the entrance of the die so that vibration is not substantially transmitted to the extruder.

10. An extrusion molding apparatus according to claim 2 wherein resonant frequency of said extrusion orifice gap adjustment means is selected to be equal to the resonant frequency of the die.

* * * * *